United States Patent Office 3,819,739
Patented June 25, 1974

3,819,739
ALKYNE REMOVAL FROM HYDROCARBON STREAMS
Darryl R. Fahey, Bartlesville, Okla., assignor to Phillips Petroleum Company
No Drawing. Filed Nov. 16, 1972, Ser. No. 307,024
Int. Cl. C07c 11/00
U.S. Cl. 260—677 A    12 Claims

ABSTRACT OF THE DISCLOSURE

Catalysts having the formula $[Co_2(CO)_6L_2]$ or $$[Co(CO)_3L_2][Co(CO)_4]$$

are employed to remove alkynes having from 2 to 20 carbon atoms from hydrocarbon streams.

This invention relates to the removal of alkynes from hydrocarbon streams.

In one of its more specific aspects, this invention relates to the removal of acetylene from ethylene streams through the employment of a cobalt complex catalyst.

In many instances, the removal of alkynes from hydrocarbon streams is desirable. There has now been discovered a method of removing alkynes from such streams by the employment of a catalyst which is relatively insensitive to water and carbon monoxide and by a method which enables the simple separation of the hydrocarbon stream from those forms to which the alkynes are converted.

According to the present invention there is provided a method for the removal of alkynes from a hydrocarbon stream which comprises contacting the stream with an effective amount of at least one catalyst selected from the group consisting of $[Co_2(CO)_6L_2]$ and $$[Co(CO)_3L_2][Co(CO)_4]$$

under conditions to remove at least a portion of the alkynes from the feedstream and recovering the hydrocarbon stream, L being as hereinafter defined.

The invention is applicable to the removal of alkynes, both terminal and internal, of from 2 to about 20 carbon atoms per molecule from $C_2$ to $C_{20}$ hydrocarbon streams and particularly from streams comprising olefins, cycloolefins and conjugated dienes. These hydrocarbon streams can also contain alkanes, cycloalkanes, aromatic hydrocarbons and their mixtures. The invention is especially suitable for the removal of acetylene from ethylene streams.

The feedstream needs no pretreatment although it should be reasonably low in water content.

The invention is carried out by introducing the feedstream into contact with a catalyst having either of the two formulas $$[Co_2(CO)_6L_2] \text{ or } [Co(CO)_3L_2][Co(CO)_4]$$

in which formulas L represents a ligand selected from the group consisting of CO, $R_3P$, $R_3PO$, $R_3N$ and pyridine, R being a hydrocarbon radical having 1 to about 12 carbon atoms such as alkyl, cycloalkyl, aryl and combinations thereof such as alkaryl, aralkyl and the like.

Examples of suitable catalysts of the formula $$[Co_2(CO)_6L_2]$$

include octacarbonyl dicobalt;
hexacarbonylbis(tri-n-butylphosphine)dicobalt;
hexacarbonylbis(tri-n-butylphosphine oxide)dicobalt;
hexacarbonylbis(pyridine)dicobalt;
hexacarbonylbis(triethylamine)dicobalt;
hexacarbonylbis(triphenylphosphine)dicobalt;
hexacarbonylbis(tricyclohexylphosphine)dicobalt and the like.

Examples of suitable catalysts of the formula $$[Co(CO)_3L_2][Co(CO)_4]$$

include tricarbonylbis(tributylphosphine)cobalt(I) tetracarbonylcobaltate(-I);
tricarbonylbis(tricyclohexylphosphine)cobalt(I) tetracarbonylcobaltate(-I);
tricarbonylbis(tributylphosphine oxide)cobalt(I) tetracarbonylcobaltate(-I);
tricarbonylbis(triethylamine)cobalt(I) tetracarbonylcobaltate(-I);
tricarbonylbis(pyridine)cobalt(I) tetracarbonylcobaltate(-I);
tricarbonylbis(triphenylphosphine)cobalt(I) tetracarbonylcobaltate(-I), and the like.

The feedstream is introduced into contact with the catalyst at a temperature within the range of from about 80 to about 150° C., preferably at a temperature from about 100 to 130° C. and at a pressure to maintain the reaction mixture, preferably, substantially in the liquid phase although the feedstream can be substantially in the gaseous phase.

The feedstream is passed into contact with from about 0.1 to about 1000 gram millimol of catalyst per 100 g. of alkynes contained in the feedstream, the contact time being up to about 24 hours.

Contact between the feedstream and the catalyst is preferably carried out by passing the feedstream through a dispersion or solution of the catalyst in an inert diluent such as alkane, a cycloalkane or an aromatic hydrocarbon.

Following the recovery of the feedstream from the catalyst contact, the feedstream can be fractionated to separate the products to which the alkynes have been converted.

The best mode for carrying out this invention is indicated by the following example.

EXAMPLE

A gaseous mixture of ethylene and acetylene was passed into contact with a solution comprising 0.28 mmol of tricarbonylbis(tributylphosphine)cobalt(I) tetracarbonylcobaltate(-I), $[Co(CO)_3(PBu_3)_2][Co(CO)_4]$ in 100 ml. of xylene. The mixture was passed through the solution at a rate of 4 ml./min. for specific periods of times during which the solution was maintained at various temperatures. Results were as follows, the inlet feedstream containing 1.816 weight percent acetylene and 98.184 weight percent ethylene.

| Elapsed time, hrs.: | Solution temperature, °C. | Effluent stream, wt. percent Acetylene | Ethylene |
| --- | --- | --- | --- |
| 1.5 | 80 | 1.793 | 98.207 |
| 3.0 | 100 | 1.404 | 98.596 |
| 4.0 | 115 | 0.941 | 99.059 |
| 5.0 | 120 | 0.102 | 99.898 |
| 5.3 | 125 | 0.058 | 99.865 |
| 7.5 | 127 | <0.005 | >99.95 |

Analyses were by gas-liquid chromatography.

The above data indicate the operability of the method of this invention over a wide range of temperatures within the range previously set forth.

It will be evident from the foregoing that various modifications can be made to the method of the invention.

What is claimed is:

1. A method of removing alkynes containing from 2 to about 20 carbon atoms per molecule from a hydrocarbon stream which comprises contacting said stream comprising said alkynes with an effective amount of at least one catalyst selected from the group consisting of $$[Co_2(CO)_6L_2] \text{ and } [Co(CO)_3L_2][Co(CO)_4]$$

wherein L is a ligand selected from the group consisting of CO, $R_3P$, $R_3PO$, $R_3N$ and pyridine, wherein R is a hydrocarbon radical having from 1 to about 12 carbon atoms under conditions to remove at least a portion of said alkynes from said stream and recovering said stream.

2. The method of claim 1 in which said catalyst has the general formula $[Co(CO)_6L_2]$ and is selected from the group of compounds consisting of octacarbonyl dicobalt; hexacarbonylbis(tricyclohexylphosphine)dicobalt. hexacarbonylbis(tri-n-butylphosphine oxide)dicobalt; hexacarbonylbis(pyridine)dicobalt; hexacarbonylbis(triethylamine)dicobalt; hexacarbonylbis(triphenylphosphine)dicobalt; and hexacarbonylbis(tricyclohexylphosphine) dicobalt.

3. The method of claim 1 in which said catalyst has the general formula $[Co(CO)_3L_2][Co(CO)_4]$ and is selected from the group of compounds consisting of tricarbonylbis(tributylphosphine)cobalt(I) tetracarbonylcobaltate(-I);
tricarbonylbis(tricyclohexylphosphine)cobalt(I) tetracarbonylcobaltate(-I);
tricarbonylbis(tributylphosphine oxide)cobalt(I) tetracarbonylcobaltate(-I);
tricarbonylbis(triethylamine)cobalt(I) tetracarbonylcobaltate(-I);
tricarbonylbis(pyridine)cobalt(I) tetracarbonylcobaltate (-I); and
tricarbonylbis(triphenylphosphine)cobalt (I) tetracarbonylcobaltate(-I).

4. The method of claim 1 in which said stream is contacted with said catalyst at a temperature within the range of from about 80° C. to about 150° C.

5. The method of claim 4 in which said stream is substantially in the liquid phase.

6. The method of claim 4 in which said stream is substantially in the gaseous phase.

7. The method of claim 1 in which said stream is contacted with said catalyst at a rate within the range of from about 0.1 to about 1000 gram millimol of catalyst per 100 g. of alkynes in said stream.

8. The method of claim 1 in which said stream is passed through a dispersion of said catalyst in an inert diluent.

9. The method of claim 1 in which said stream is passed through a solution comprising said catalyst and an inert diluent.

10. The method of claim 3 in which said catalyst is tricarbonylbis(tributylphosphine)cobalt(I) tetracarbonylcobaltate(-I).

11. A method of removing acetylene from an ethylene stream which comprises contacting said stream with an effective amount of at least one catalyst selected from the group consisting of $$[Co_2(CO)_6L_2] \text{ and } [Co(CO)_3L_2][Co(CO)_4]$$

wherein L is a ligand selected from the group consisting of CO, $R_3P$, $R_3PO$, $R_3N$ and pyridine, wherein R is a hydrocarbon radical having from 1 to about 12 carbon atoms under conditions to remove acetylene from said stream and recovering said stream.

12. The method of claim 11 in which said catalyst comprises tricarbonylbis(tributylphosphine)cobalt I tetracarbonylcobaltate(-I).

References Cited
UNITED STATES PATENTS

| Patent No. | Date | Inventor | Class |
|---|---|---|---|
| 3,481,961 | 12/1969 | Pregaglia et al. | 260—683.9 X |
| 3,453,302 | 7/1969 | Pregaglia et al. | 260—683.9 X |
| 2,636,911 | 4/1953 | Ray | 260—677 |
| 2,851,504 | 9/1958 | Hogan | 260—677 |
| 2,401,444 | 6/1946 | Welling | 260—677 |
| 2,418,183 | 4/1947 | McCombie | 260—677 |
| 2,399,882 | 5/1946 | Morrell et al. | 260—681.5 |
| 2,775,634 | 12/1956 | Nowlin | 260—677 |
| 3,401,206 | 9/1968 | Wulf et al. | 260—666 |

DELBERT E. GANTZ, Primary Examiner

J. M. NELSON, Assistant Examiner

U.S. Cl. X.R.

260—681.5

CERTIFICATE OF CORRECTION

Patent No. 3,819,739                      Dated: June 25, 1974

Darryl R. Fahey

It is certified that error appears in the above-identified patent and that said Letters Patent are hereby corrected as shown below:

Column 3, line 16, delete "$[Co(CO)_6L_2]$" and insert therefor —— $[Co_2(CO)_6L_2]$ ——; line 18, delete "hexacarbonylbis(tricyclohexylphosphine)dicol and insert therefor —— hexacarbonylbis(tri-n-butylphosphine)dicobalt; ——.

Signed and sealed this 5th day of November 1974.

(SEAL)
Attest:

McCOY M. GIBSON JR.                    C. MARSHALL DANN
Attesting Officer                      Commissioner of Patents